(12) United States Patent
Smith (10) Patent No.: US 7,174,656 B1
(45) Date of Patent: Feb. 13, 2007

(54) TAPE MEASURE SYSTEM

(76) Inventor: Leslie G. Smith, P.O. Box 1443, Cut Bank, MT (US) 59427

( * ) Notice: Subject to any disclaimer, the term of this patent is extended or adjusted under 35 U.S.C. 154(b) by 0 days.

(21) Appl. No.: 11/172,548

(22) Filed: Jun. 29, 2005

(51) Int. Cl.
*G01B 3/10* (2006.01)

(52) U.S. Cl. .............................. 33/769; 33/770; 33/668; D10/72

(58) Field of Classification Search ................ 33/768, 33/668, 769, 759, 760, 770; D10/72, 74
See application file for complete search history.

(56) References Cited

U.S. PATENT DOCUMENTS

| | | | | |
|---|---|---|---|---|
| 14,409 A | * | 3/1856 | Saxton | 56/246 |
| 1,986,551 A | * | 1/1935 | Anderson | 33/769 |
| 2,005,677 A | | 6/1935 | Higbee | 33/138 |
| 2,016,483 A | * | 10/1935 | Carlson | 33/767 |
| 2,207,277 A | * | 7/1940 | Volz | 33/769 |
| 2,347,273 A | * | 4/1944 | Leascher | 33/765 |
| D152,838 S | * | 2/1949 | Stephen | D19/38 |
| 2,649,787 A | | 8/1953 | Kobayashi | 33/189 |
| 3,100,937 A | * | 8/1963 | Burch | 33/770 |
| 3,100,941 A | * | 8/1963 | Taylor | 33/668 |
| 3,192,630 A | | 7/1965 | Dineson | 33/42 |
| 3,220,112 A | * | 11/1965 | Quenot | 33/769 |
| 3,802,083 A | | 4/1974 | Freed | 33/138 |
| 4,630,376 A | | 12/1986 | Pentecost | 33/138 |
| 4,667,412 A | | 5/1987 | Carlson | 33/138 |
| 4,760,648 A | | 8/1988 | Doak et al. | 33/668 |
| 4,890,393 A | | 1/1990 | St. Jean | 33/768 |
| 4,908,954 A | | 3/1990 | Johnson | 33/768 |
| 4,914,830 A | | 4/1990 | Legare | 33/668 |
| 4,965,941 A | * | 10/1990 | Agostinacci | 33/668 |
| 4,999,924 A | * | 3/1991 | Shields | 33/770 |
| 5,134,784 A | | 8/1992 | Atienza | 33/668 |
| 5,435,074 A | | 7/1995 | Holevas et al. | 33/668 |
| 5,829,152 A | | 11/1998 | Potter et al. | 33/668 |
| 6,070,338 A | * | 6/2000 | Garity | 33/760 |
| 6,178,655 B1 | | 1/2001 | Potter et al. | 33/668 |
| 6,701,636 B2 | | 3/2004 | Scarborough | 33/768 |
| 6,880,260 B2 | * | 4/2005 | Baida | 33/668 |
| 6,931,734 B2 | * | 8/2005 | Elder et al. | 33/42 |
| 2004/0123479 A1 | | 7/2004 | Tufts et al. | 33/768 |
| 2004/0143984 A1 | | 7/2004 | Scarborough | 33/668 |

* cited by examiner

*Primary Examiner*—Diego Gutierrez
*Assistant Examiner*—Amy R. Cohen
(74) *Attorney, Agent, or Firm*—Wesley B. Ames; Ames IP Law (57) ABSTRACT

A tape measure system for efficiently marking a measured object. The tape measure system includes a housing with a recoil unit containing a length of a tape measure, a dispensing neck extending from the housing for guiding and dispensing the tape measure, and wherein the dispensing neck includes a guide edge for marking a surface of a measured object. A pair of teeth extend from the dispensing neck for selectively engaging and marking the surface of the measured object. The dispensing neck includes a recessed portion exposing a portion of the tape measure for allowing frictional engagement of the tape measure by the user.

15 Claims, 8 Drawing Sheets

TAPE MEASURE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to tape measures and more specifically it relates to a tape measure system for efficiently marking a measured object.

2. Description of the Related Art

Any discussion of the prior art throughout the specification should in no way be considered as an admission that such prior art is widely known or forms part of common general knowledge in the field.

Tape measures have been in use for years. Typically, a conventional tape measure is comprised of a housing containing a recoil unit and a flexible tape measure that is dispensed from and stored within the housing by the recoil unit. One problem with conventional tape measures is that they do not provide a convenient system for marking a measured object. Another problem with conventional tape measures is that they are difficult to control the recoil of the tape measure.

While these devices may be suitable for the particular purpose to which they address, they are not as suitable for efficiently marking a measured object. Conventional tape measures do not provide a convenient system for marking a measured object and also are inconvenient for controlling the recoil velocity of a tape measure.

In these respects, the tape measure system according to the present invention substantially departs from the conventional concepts and designs of the prior art, and in so doing provides an apparatus primarily developed for the purpose of efficiently marking a measured object.

BRIEF SUMMARY OF THE INVENTION

In view of the foregoing disadvantages inherent in the known types of tape measures now present in the prior art, the present invention provides a new tape measure system construction wherein the same can be utilized for efficiently marking a measured object.

The general purpose of the present invention, which will be described subsequently in greater detail, is to provide a new tape measure system that has many of the advantages of the tape measures mentioned heretofore and many novel features that result in a new tape measure system which is not anticipated, rendered obvious, suggested, or even implied by any of the prior art tape measures, either alone or in any combination thereof.

To attain this, the present invention generally comprises a housing with a recoil unit containing a length of a tape measure, a dispensing neck extending from the housing for guiding and dispensing the tape measure, and wherein the dispensing neck includes a guide edge for marking a surface of a measured object. A pair of teeth extend from the dispensing neck for selectively engaging and marking the surface of the measured object. The dispensing neck includes a recessed portion exposing a portion of the tape measure for allowing frictional engagement of the tape measure by the user.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tape measure system that will overcome the shortcomings of the prior art devices.

A second object is to provide a tape measure system for efficiently marking a measured object.

Another object is to provide a tape measure system that allows a user to control the retraction velocity of the tape measure.

An additional object is to provide a tape measure system that allows for the marking of a measured object.

A further object is to provide a tape measure system that marks a measured object without the need of a marking device.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8b illustrate a tape measure system 10, which comprises a housing 20 with a recoil unit 21 containing a length of a tape measure 30, a dispensing neck 24 extending from the housing 20 for guiding and dispensing the tape measure 30, and wherein the dispensing neck 24 includes a guide edge 28 for marking a surface of a measured object. A pair of teeth 40 extend from the dispensing neck 24 for selectively engaging and marking the surface of the measured object. The dispensing neck 24 includes a recessed portion 29 exposing a portion of the tape measure 30 for allowing frictional engagement of the tape measure 30 by the user.

B. Housing and Recoil Unit

FIGS. 1 through 8b illustrate an exemplary housing 20. The housing 20 includes a recoil unit 21 that receives and dispenses a length of a tape measure 30. The recoil unit 21 is preferably biased to recoil said tape measure 30 upon said recoil unit 21 as desired. The housing 20 preferably includes a locking switch 22 for locking a position of the tape measure 30 which is well known in the art.

The tape measure 30 preferably includes a lip 32 and a plurality of measurement indicia. The tape measure 30 is comprised of any conventional structure and material commonly utilized to form a tape measure 30.

C. Dispensing Neck

Figure 3A:
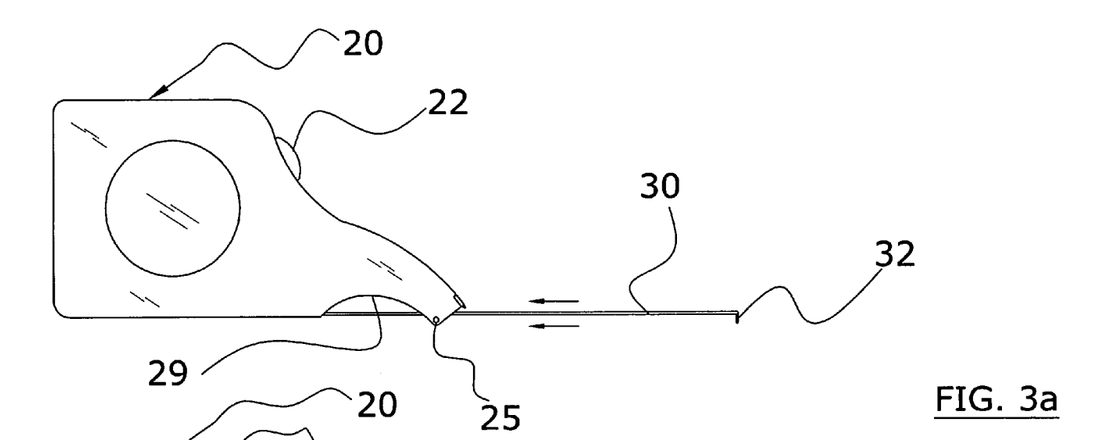
FIG. 3a is a side view of the present invention with the tape measure extended.
Figure 3B:
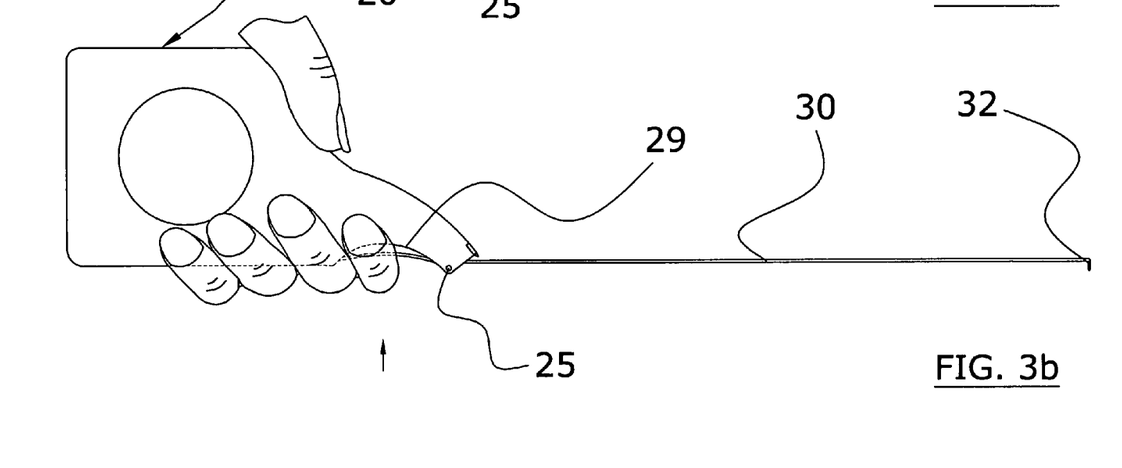
FIG. 3b is a side view of the present invention with the tape measure frictionally engaged by the user within the recessed portion of the dispensing neck.
Figure 4:
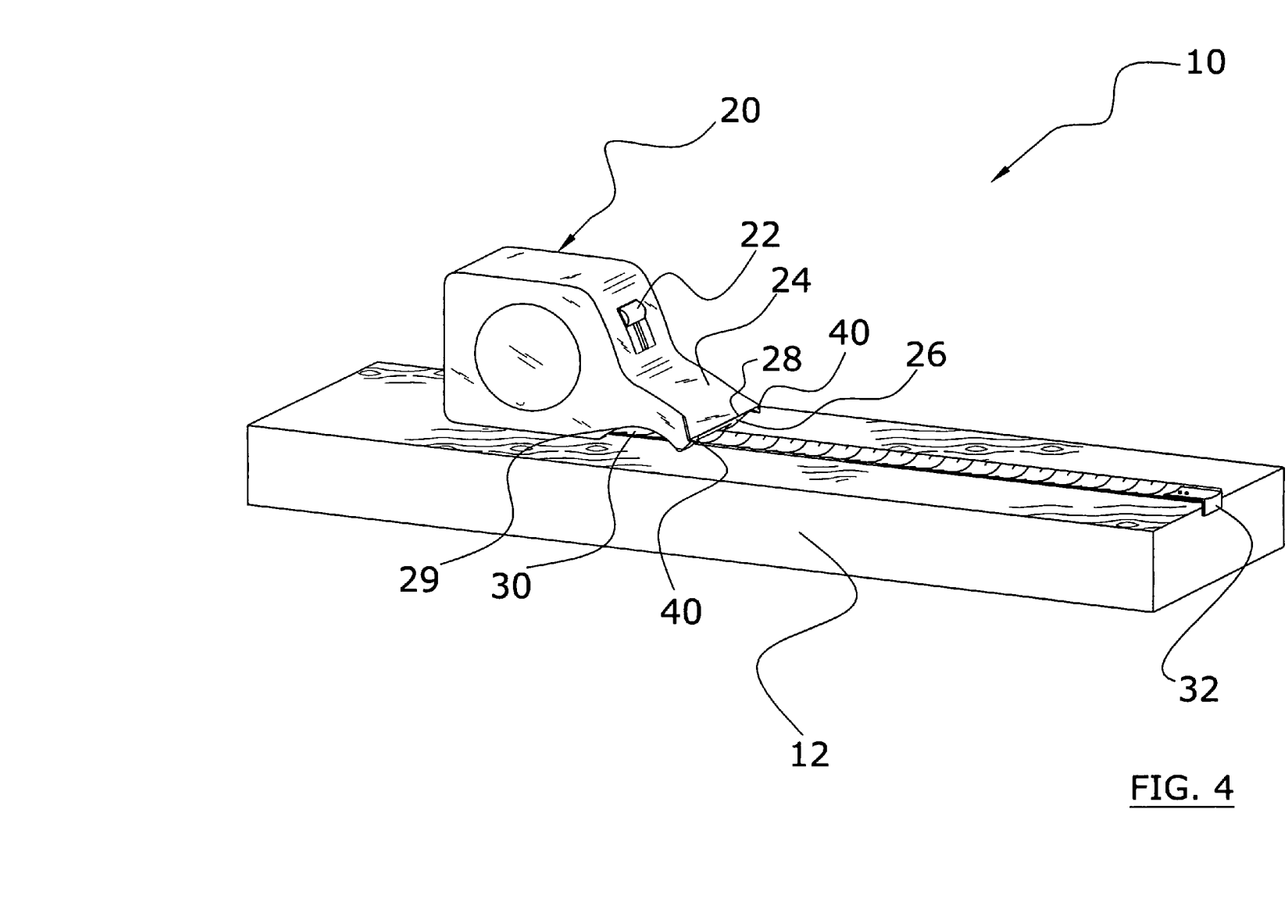
FIG. 4 is an upper perspective view of the present invention measuring a board.
Figure 5:
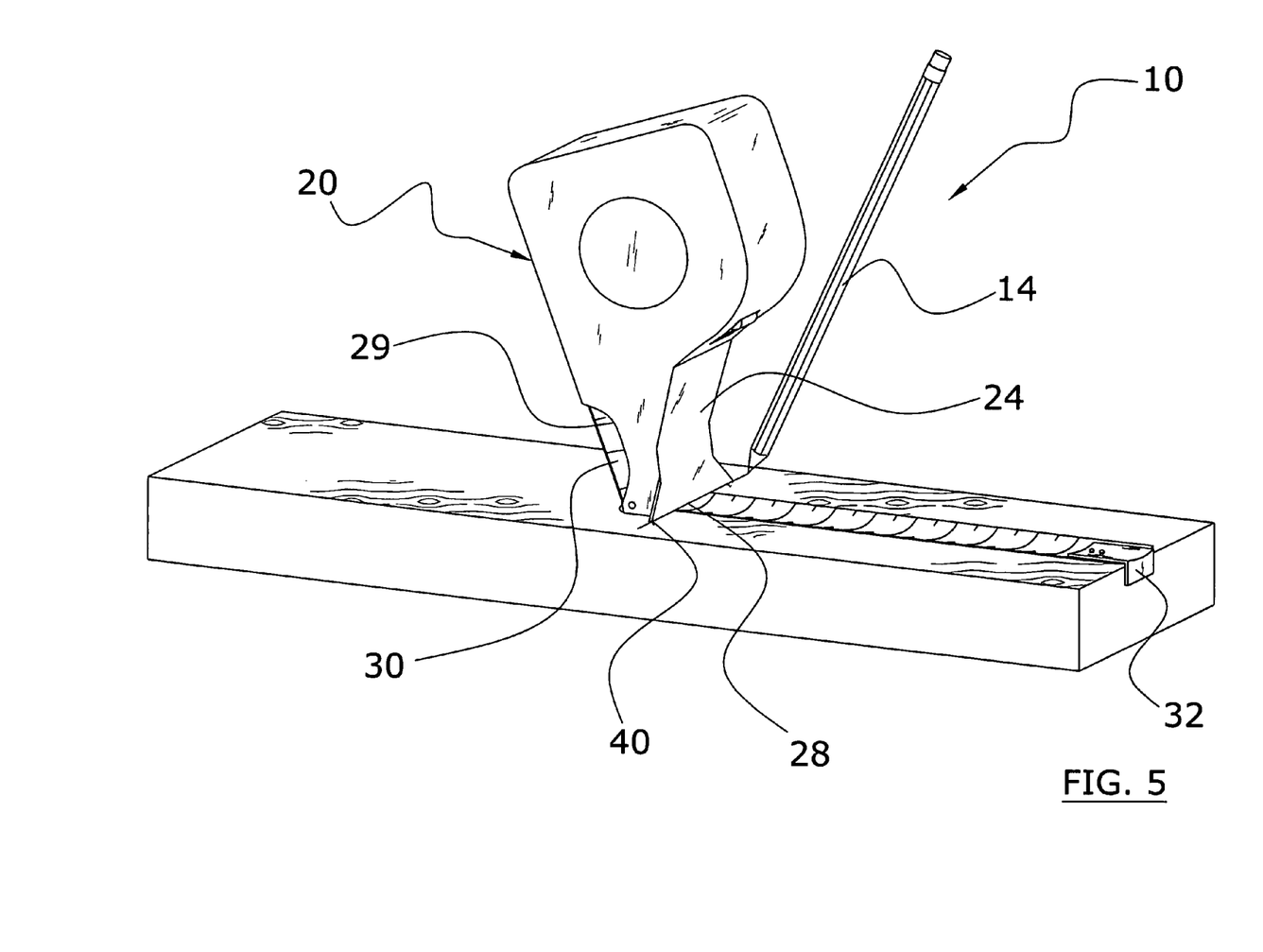
FIG. 5 is an upper perspective view of the present invention tilted to allow for marking of the board member along the guide edge.
Figure 6:
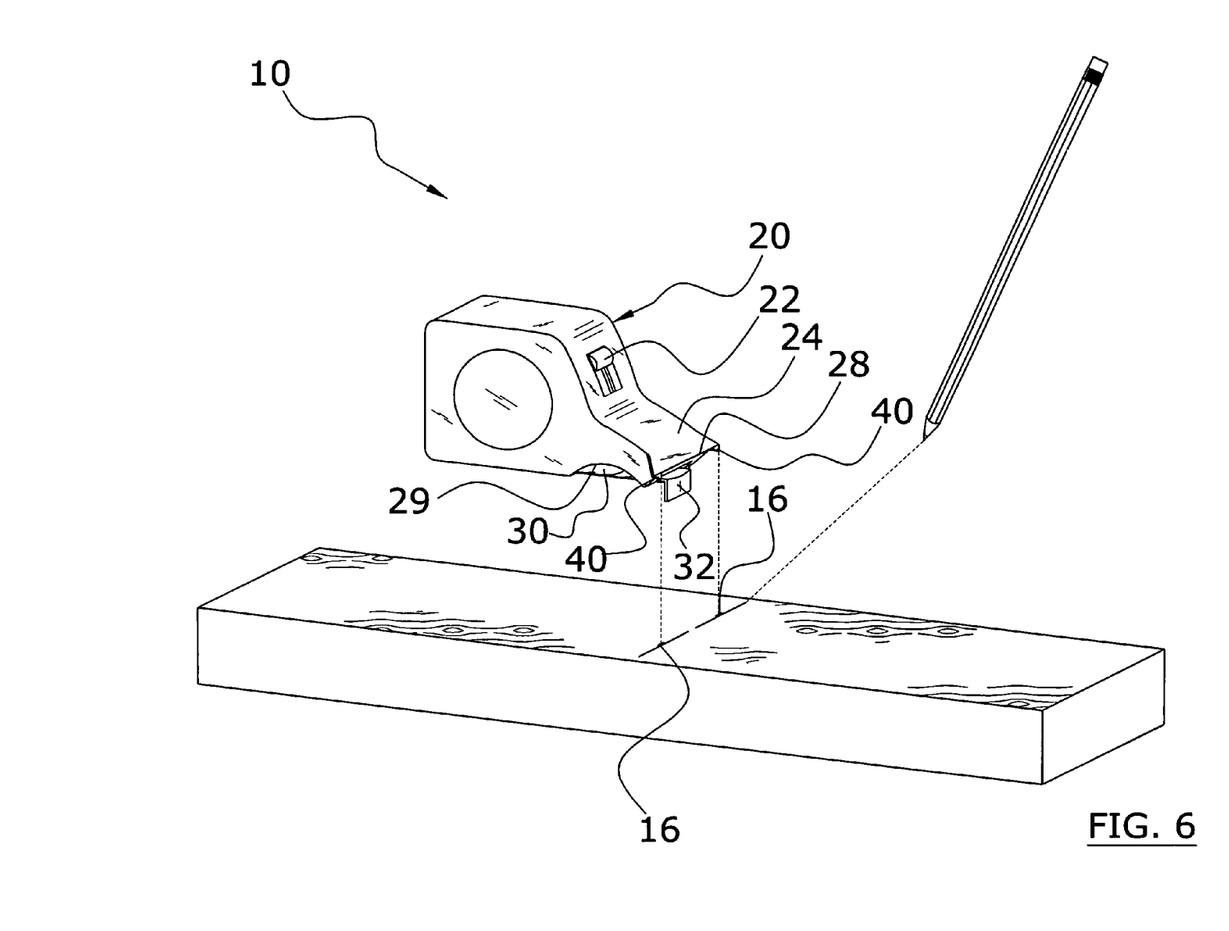
FIG. 6 is an upper perspective view of the present invention removed from a marked board.

The dispensing neck 24 extends from the housing 20 for guiding and dispensing the tape measure 30 as illustrated in FIGS. 1 through 8b of the drawings. The dispensing neck 24 includes a guide edge 28 for marking a surface of a measured object as best illustrated in FIGS. 4 through 6 of the drawings. The guide edge 28 is preferably comprised of a straight structure that extends substantially transversely with respect to the tape measure 30.

Figure 1:
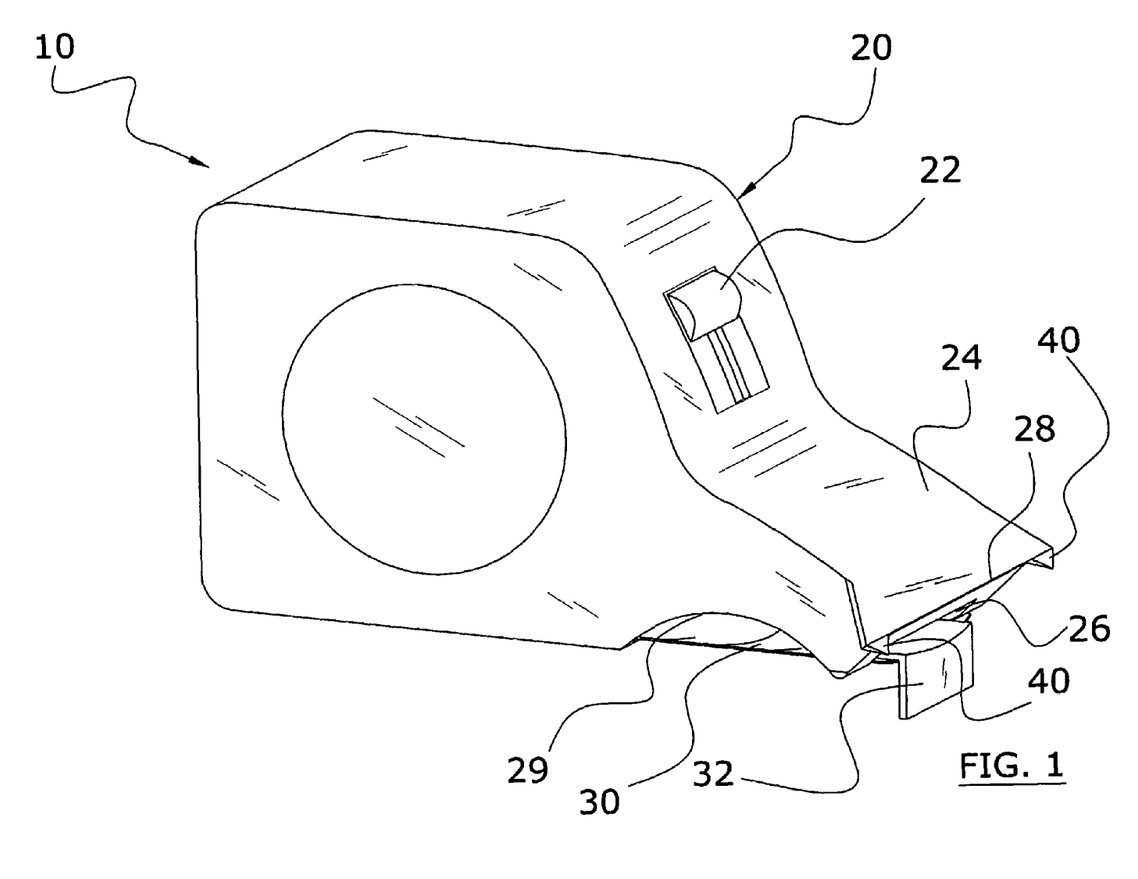
FIG. 1 is an upper perspective view of the present invention.
Figure 2:
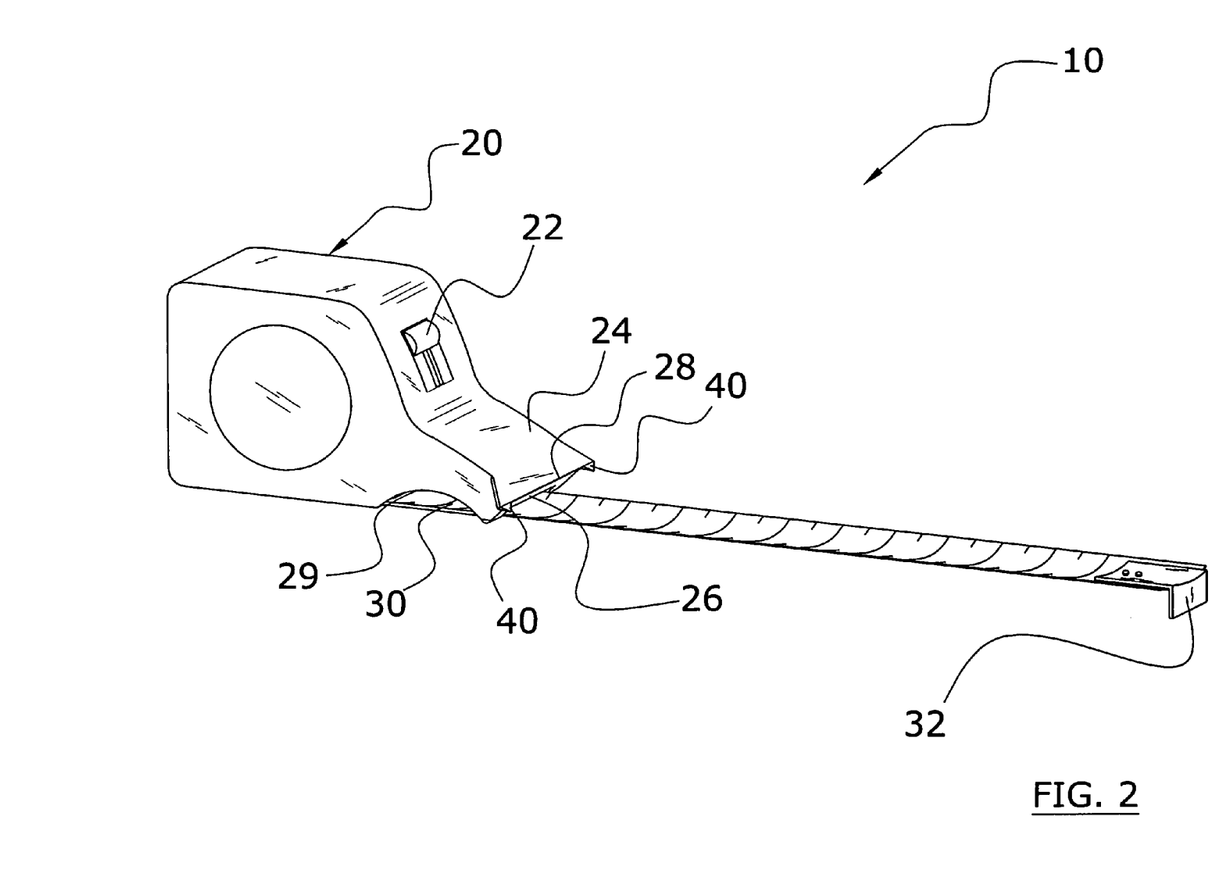
FIG. 2 is an upper perspective view of the present invention with the tape measure extended.

The dispensing neck 24 includes a guide slot 26 for slidably receiving and dispensing the tape measure 30 as illustrated in FIG. 1 of the drawings. At least one roller 23 is preferably attached to the distal portion of the dispensing neck 24 for supporting the tape measure 30 as it is dispensed and recoiled.

Figure 7A:
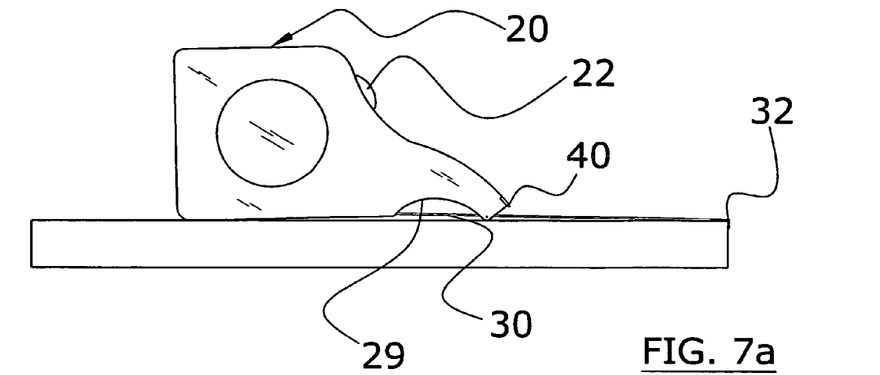
FIG. 7a is a side view of the present invention measuring a board.
Figure 7B:
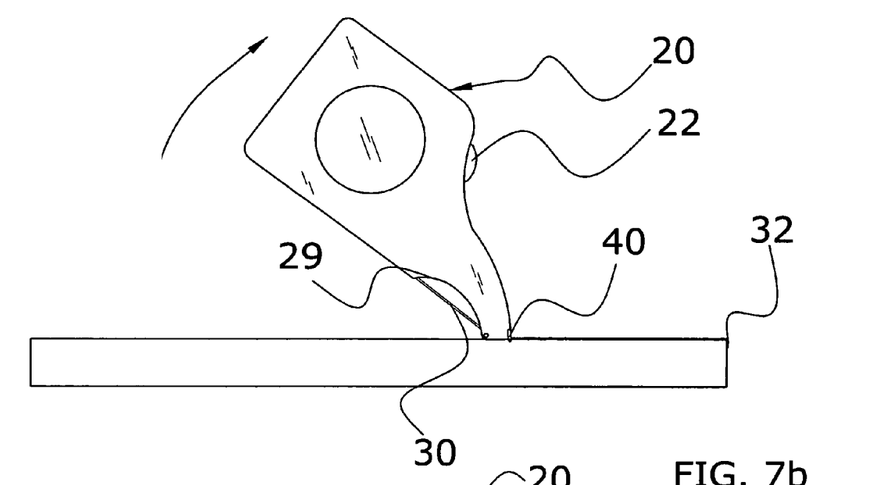
FIG. 7b is a side view of the present invention tilted to allow for marking of the board member along the guide edge.
Figure 7C:
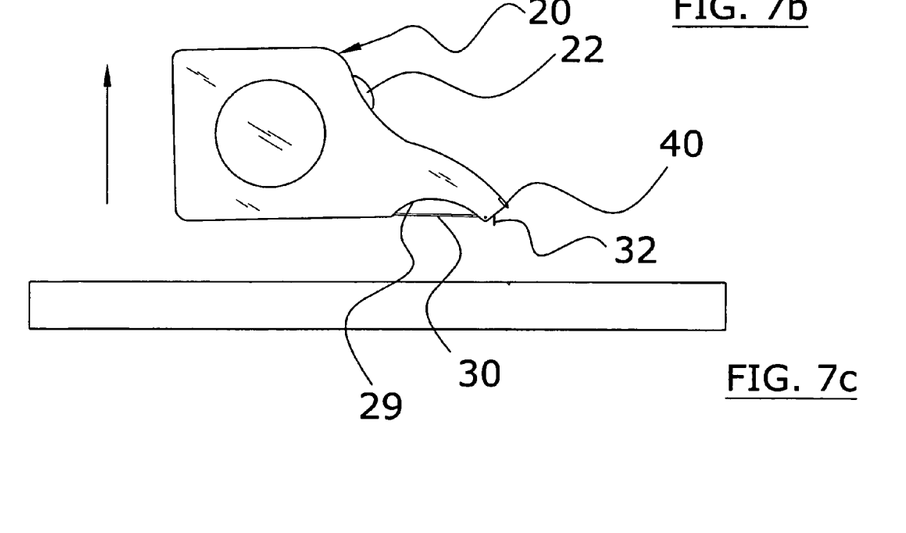
FIG. 7c is a side view of the present invention removed from a marked board.
Figure 8A:
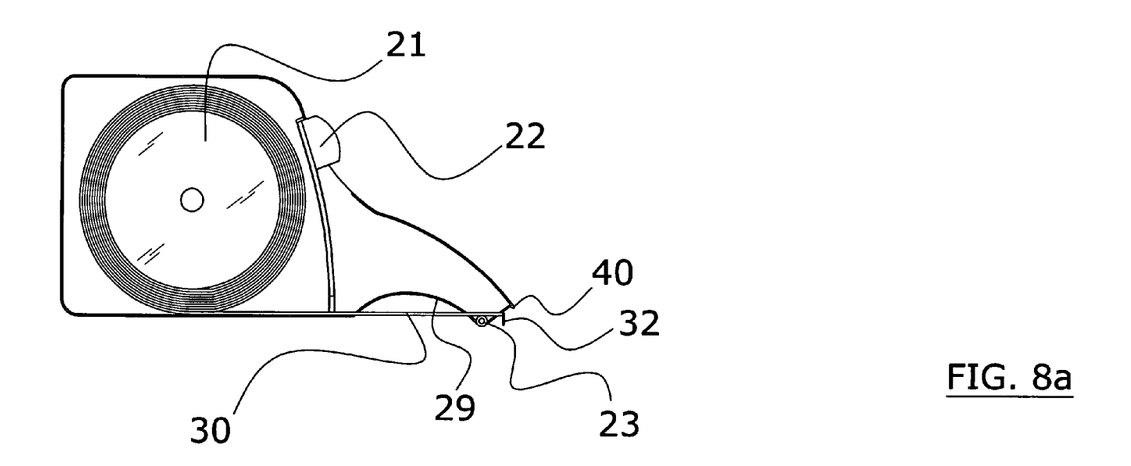
FIG. 8a is a side cutaway view of the present invention.
Figure 8B:
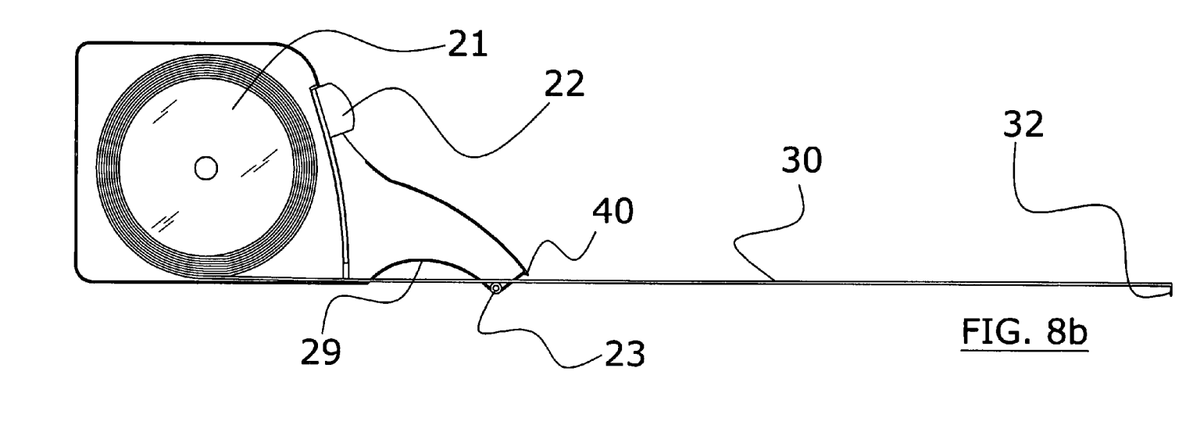
FIG. 8b is a side cutaway view of the present invention with the tape measure extended from the housing.

The dispensing neck 24 includes a pivot point 25 that elevates the pair of teeth 40 above the measured object during measuring and that allows the pair of teeth 40 to be pivoted towards the measured object for creating indentations 16 as best illustrated in FIGS. 7a through 7c of the drawings. The pivot point 25 is comprised of a lowered and extended structure. In addition, the pivot point 25 is preferably comprised of a rounded structure for facilitating pivoting of the present invention upon the object being measured (e.g. board 12).

The dispensing neck 24 includes a recessed portion 29 exposing a portion of the tape measure 30 for allowing frictional engagement of the tape measure 30 by the fingers of a user as illustrated in FIGS. 1 and 3b of the drawings. The recessed portion 29 is preferably comprised of a concave structure as illustrated in FIGS. 1 through 3b of the drawings.

D. Teeth

A pair of teeth 40 extend from the guide edge 28 of the dispensing neck 24 for selectively engaging and marking the surface of the measured object as shown in FIG. 1 of the drawings. The pair of teeth 40 are positioned on opposite sides of the tape measure 30 as further shown in FIG. 1. The teeth 40 are comprised of a pointed structure for creating indentations 16 within the measured object (e.g. board 12) when the present invention is pivoted about the pivot point 25.

E. Operation of Invention

In operation, the user measures an object (e.g. board 12) as they normally would as shown in FIGS. 4 and 7a of the drawings. Once the desired measurement is located, the user positions the guide edge 28 at the location of the desired measurement on the tape measure 30. The user then pivots the present invention about the pivot point 25 so that the teeth 40 engage the surface of the measured object 12 as shown in FIGS. 5 and 7b. The user then is able to mark along the guide edge 28 with a marking device 14 (e.g. pencil, pen, chalk) the location of the measurement on the object 12. Alternatively, the user may just use the indentations 16 created within the object 12 by the teeth 40 to later draw a marking line on the object 12. The user then removes the present invention from the object 12 and may then complete the marking line where the tape measure 30 was or may simply cut the object as marked as shown in FIGS. 6 and 7c of the drawings. During the recoil of the tape measure 30, the user may also extend one or more of their fingers within the recessed portion 29 to frictionally engage the tape measure 30 during recoil to control the velocity and position of the tape measure 30 without having their fingers engaged by the lip 32 of the tape measure 30 as shown in FIG. 3b of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A tape measure system, comprising
    a housing including a recoil unit containing a length of a tape measure; and
    a dispensing neck extending from said housing for guiding and dispensing said tape measure, said dispensing neck comprising a proximal end located adjacent said housing and a distal end for dispensing a length of said tape measure, wherein said dispensing neck includes a pair of teeth positioned on opposite sides of said tape measure and extending from the distal end of said neck for selectively engaging and marking a surface of a measured object and a pivot point positioned on said neck such that pivoting said housing and dispensing neck about said pivot point brings said teeth into said surface.

2. The tape measure system of claim 1, wherein said dispensing neck includes a guide slot for slidably receiving and dispensing said tape measure.

3. The tape measure system of claim 1, wherein said tape measure includes a lip.

4. The tape measure system of claim 1, wherein said dispensing neck includes a recessed portion on the bottom of said dispensing neck exposing a portion of said tape measure for allowing frictional engagement of said tape measure by said user.

5. The tape measure system of claim 4, wherein said recessed portion is comprised of a concave structure.

6. The tape measure system of claim 4, wherein said recessed portion is between a body of said housing and a distal portion of said dispensing neck.

7. The tape measure system of claim 1, wherein said dispensing neck further comprises a straight guide edge, wherein pivoting said housing and dispensing neck about said pivot point brings said guide edge to said surface.

8. The tape measure system of claim 7, wherein said pair of teeth extend from said guide edge.

9. A tape measure system, comprising:
a housing including a recoil unit containing a length of a tape measure;
a dispensing neck extending from said housing for guiding and dispensing said tape measure, wherein said dispensing neck includes a straight guide edge for marking a surface of a measured object; and
a pair of teeth extending from said guide edge of said dispensing neck for selectively engaging and marking said surface of said measured object, wherein said pair of teeth are positioned on opposite sides of said tape measure;
wherein said dispensing neck includes a pivot point that elevates said pair of teeth above the measured object during measuring and that allows said pair of teeth to be pivoted towards the measured object for creating indentations;
wherein said dispensing neck includes a recessed portion on the bottom of said dispensing neck exposing a portion of said tape measure for allowing frictional engagement of said tape measure by said user.

10. The tape measure system of claim 9, wherein said dispensing neck includes a guide slot for slidably receiving and dispensing said tape measure.

11. The tape measure system of claim 9, wherein said tape measure includes a lip.

12. The tape measure system of claim 9, wherein said recessed portion is comprised of a concave structure.

13. The tape measure system of claim 9, wherein said recessed portion is between a body of said housing and a distal portion of said dispensing neck.

14. A tape measure system, comprising
a housing including a recoil unit containing a length of a tape measure; and
a dispensing neck extending from said housing for guiding and dispensing said tape measure,
wherein said dispensing neck includes a proximal end located adjacent said housing and a distal end for dispensing a length of said tape measure, a top portion and a bottom portion; a recessed portion on the bottom portion of said dispensing neck exposing a portion of said tape measure for allowing frictional engagement of said tape measure by said user; a guide edge at the distal end of said dispensing neck transverse to said tape measure; and a pivot point located on the bottom portion of said dispensing neck proximal to the distal end of said dispensing neck, wherein pivoting of said housing and said dispensing neck about said pivot point brings a surface of the guide edge above the measuring tape into contact with the surface of an object to be measured.

15. The tape measure system of claim 14, wherein said dispensing neck includes a pair of teeth extending from said neck for selectively engaging and marking said surface of said measured object and pivoting of said housing and said dispensing neck about said pivot point brings said teeth into contact with the surface of an object being measured.

* * * * *